United States Patent [19]
Welden

[11] Patent Number: 5,775,581
[45] Date of Patent: Jul. 7, 1998

[54] DUAL HEAT SOURCE HEATING SYSTEM

[76] Inventor: David P. Welden, N. Indiana Ave., Iowa Falls, Iowa 50126

[21] Appl. No.: 719,247

[22] Filed: Sep. 24, 1996

[51] Int. Cl.⁶ .................................................. F24D 3/00
[52] U.S. Cl. ............................. 237/8 R; 237/56; 237/61
[58] Field of Search ............................. 237/8 R, 56, 61, 237/62

[56] References Cited

U.S. PATENT DOCUMENTS

| | | | |
|---|---|---|---|
| 971,966 | 10/1910 | Bolze | 237/62 |
| 2,714,715 | 8/1955 | Manier. | |
| 3,329,344 | 7/1967 | Smith | 237/62 |
| 3,994,281 | 11/1976 | Godart | 237/61 |
| 4,258,878 | 3/1981 | Van Pachtenbeke. | |
| 4,335,848 | 6/1982 | Eidejus. | |
| 4,600,144 | 7/1986 | Zelczer. | |
| 4,699,315 | 10/1987 | White | 237/8 R |
| 5,305,735 | 4/1994 | Welden | 126/355 |
| 5,348,078 | 9/1994 | Dushane. | |
| 5,405,079 | 4/1995 | Neeley. | |
| 5,465,588 | 11/1995 | McCahill et al. | 62/127 |

FOREIGN PATENT DOCUMENTS

| 75354 | 1/1919 | Austria | 237/61 |
|---|---|---|---|

*Primary Examiner*—Harold Joyce
*Assistant Examiner*—Derek S. Boles
*Attorney, Agent, or Firm*—Henderson & Sturm

[57] ABSTRACT

A heating system for heating a building with at least a first zone and a second to be heated. The heating system includes a first heating source and a second heating source. The heating system alternates between two modes of operation. In the first mode, heat is transferred to the first zone from the first heating source and heat is transferred to the second zone from the second heating source. In the second mode of operation, heat is transferred to the first zone from the second heating source and heat is transferred to the second zone from the first heat source. Each zone may comprise one or more areas of the building. Heat exchangers and thermostats positioned in each area control the amount of heat which is ultimately transferred into the areas.

13 Claims, 9 Drawing Sheets

DUAL HEAT SOURCE HEATING SYSTEM

AUTHORIZATION PURSUANT TO 37 CFR 1.71 (d) (e)

A portion of the disclosure of this patent document, including appendices, may contain material which is subject to copyright protection. The copyright owner has no objection to the facsmile reproduction by anyone of the patent document or the present disclosure, as it appears in the Patent and Trademark Office patent file or records, but otherwise reserves all copyright rights whatsoever.

TECHNICAL FIELD

The present invention relates generally to building heating systems and more particularly to building heating system that utilizes dual heat sources and still more particularly to a heating system that alternately and simultaneously utilizes both heating sources to provide heat to different heating zones in the building.

BACKGROUND ART

Buildings are heated in a variety of ways including the use of forced air, steam, and hot water (hydronic). Of particular interest to the present invention are the hydronic heating systems. In a hydronic heating system, a heat source such as a boiler is used to heat water. The heated water is delivered to various areas or zones of the building where it passes through heat exchangers. The heat exchangers are use to transfer the heat delivered by the heated water to the particular area or zone serviced by the heat exchanger.

A fan and heating ducts are typically used to assist in the delivery of the transferred heat throughout the zone. The fan forces air across the heat exchanger while the air ducts deliver the warmed air to the various parts of the area or zone.

A significant portion of the heat generated by the boiler does not ultimately get transferred to the areas of the building which need heated. Much of this lost heat is lost through the exhaust system of the boiler. Recapture devices have been used to capture this escaping heat but the heat captured has not been sufficient to use effectively.

Therefore, there is a need for a heating system which utilizes two heating sources simultaneously with the first heating source being the primary heat source and the second heating source either designed to recapture lost heat from the first heating source or installed at a later time.

DISCLOSURE OF THE INVENTION

The present invention relates generally to building heating systems and more particularly to building heating system that utilizes dual heat sources and more particularly to heating systems that alternately and simultaneously utilizes both heating sources to provide heat to different heating zones in the building. The heating system of the present invention utilizes a first heat source and a second heat source. The second heat source may be an economizer heat source which recaptures lost or escaping heat from the first heat source.

Because the second heat source typically will not be sufficient to heat an area in a stand alone fashion, heat is provided in an alternating fashion between the first heat source and the second heat source. The building is divided into two zones. While one zone is receiving heat from one of the heat sources, the other zone is receiving heat from the other heat source. After a time, they switch and each zone then receives heat from the other heat source. After another time they switch back. This process continues indefinitely.

Each zone can be divided into multiple areas with each area including its own thermostat and heat exchange mechanism such as a heat exchanger and a fan which forces air across the heat exchanger. The forced air is then distributed throughout the area.

Controlling which zone receives heat from which heat source is ultimately controlled by a series of valves. These valves are controlled in different ways depending upon if the source of the control is at the area or zone level or if the area of control is system wide in which case the valves are typically located in close proximity to the heat sources. Regardless of the position of the control, the control circuits include a time delay circuit which controls the time between switches.

An object of the present invention is to provide an improved heating system.

Another object of the present invention is to provide an improved heating system which utilizes dual heat sources.

Still another object of the present invention is to provide an improved heating system which utilizes a secondary heating source which recaptures heat lost from a primary heating source.

Another object of the present invention is to provide an improved heating system which divides a building into two zones and alternately and simultaneously provides heat to each zone from two different heating sources.

Other objects, advantages, and novel features of the present invention will become apparent from the following detailed description of the invention when considered in conjunction with the accompanying drawings.

BEST MODES FOR CARRYING OUT THE INVENTION

To assist in a better understanding of the invention, a description of different forms and embodiments of the invention will now be described in detail. Reference will be made to the accompanying drawings. Reference numbers and letters will be used in the drawings to indicate specific parts and locations on the drawings. The same reference numerals will be used throughout the drawings unless otherwise indicated. It is to be understood that the scope of the invention is not limited to the specific embodiments discussed herein.

Figure 1:
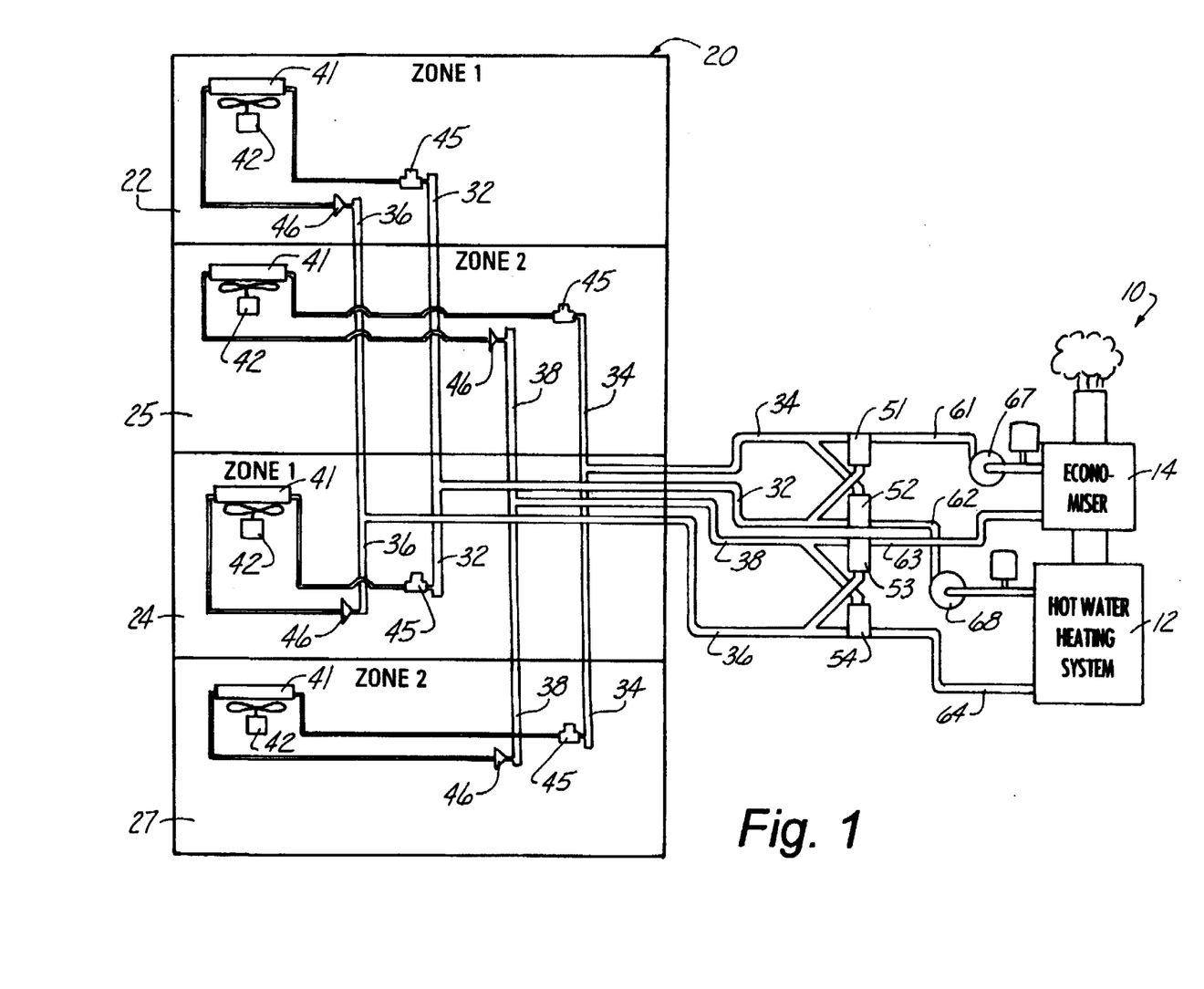
FIG. 1 is a schematic view of a dual heat source heating system built in accordance with the present invention.

Referring now to FIG. 1, a dual heat source heating system (10) built in accordance with the present invention is shown. The heating system includes a first heating source (12) and a second heat source (14). In a preferred embodiment of the present invention, the first heat source (12) is a hot water boiler and is the primary source for heat in the overall heating system (10). Still in the preferred embodiment, the second heat source (14) is an economizer heat source which recovers escaping heat from the exhaust of the primary of first heat source (12).

Utilizing a primary heat source and an economizer heat source as shown allows for a greatly increased efficiency of the heating system (10). The economizer heat source recovers heat from the exhaust that otherwise would have been lost. This means that a higher percentage of the heat produced by the primary heat source is ultimately transferred into the building.

It should be understood that the present invention will work utilizing heating systems other than the hot water system shown. Additionally, the second heating source need not be of the economizer type but could simply be a second independent heat source which does not recover heat from the first heat source. A second heat source could be added if it is determined that the first heat source needed supplementing. The heat distribution system, essentially the pipes and the control valves, could be retroactively fitted to an existing system to create a heating system of the present invention.

The building (20) is divided into zone 1 and zone 2. Each zone can have one or more areas. As shown in FIG. 1, zone 1 includes area (22) and area (24). Zone 2 includes area (25) and area (27). In a preferred implementation of the present invention, the areas of one zone area are interspersed with the areas of the other zone. However, interspersing the areas is not required as will be discussed below.

Hot water is transferred or supplied to zone 1 by means of supply pipe (32). Water is returned from zone 1 by means of return pipe (36). Hot water is transferred or supplied to zone 2 by means of supply pipe (34). Water is returned from zone 2 by means of return pipe (38).

Each area (22,24,25 and 27) includes a heat exchanger (41) and a fan (42). The heat exchangers (41) and fans (42) are used to communicate the heat from the hot water supply into the areas (22, 24, 25 and 27). The fan (42) forces air across the heat exchanger (41). The forced air is then distributed throughout the area. Many methods of heat exchanging and distribution are well known. The use of a fan forcing air across a heat exchanger is but one of these well known methods and is discussed for enabling and best mode purposes only. It should be understood that a wide variety of heat exchange and distribution techniques could be used in conjunction with the present invention.

Each area (22, 24, 25 and 27) also includes a supply valve (45) and a return valve (46). The supply valve (45) is opened electronically and when opened permits hot water to flow to the heat exchanger (41). The supply valve (45) can either be closed electronically or automatically. In the electronically closed valve, the valve is closed when it receives a signal to close. In the automatically closed valve, the supply valve automatically closes when it no longer receives the electronic signal to open. Valves of these types are common and well known in the industry. The return valve (46) is a check valve. Check valves are essentially one-way valves which only allow flow in one direction. As shown in FIG. 1, the check valves (46) will only allow flow in the direction from the heat exchangers (41) to the return pipes (36 and 38). Thus, when a supply valve (45) for a particular area is opened and allows flow of hot water to the heat exchanger (41), the corresponding check valve (46) opens and allows the water to flow into the return pipes (36 or 38). Check valves are also well known in the industry. The return valves (46) could also be of the electronic types discussed for the supply vales (45). If the return valves (46) were electronic, they would need to be opened and closed at the same time the supply valves (45) are opened and closed. In the embodiment shown, the use of check valves is preferred for the return valves (46) because check valves are less expensive that electronic valves.

Each area (22, 24, 25 and 27) also includes a thermostat (not shown). The thermostat is used to control the temperature of each area. The thermostat is an electrical switch which is activated and deactivated depending upon the temperature and the thermostat setting. The thermostat for a particular area is used to control the fan (42) and the supply valve (45) for that particular area. If the return valve (46) is also electronic, the thermostat is used to control that valve as well. The use of thermostats to control valve opening and closing as well as activation of heat distribution methods such as a fan is well known in the industry.

If the temperature is above the setting on the thermostat for a particular area, it is undesirable for the heating system to provide heat to that particular area. In this case the thermostat will maintain the fan (42) in an off position and keep the supply valve (45) closed. When the temperature is below the setting on the thermostat for a particular area, and thus desirable for the area to receive heat, the thermostat will activate the fan (42) for that particular area such that air is forced over the heat exchanger (41) and open the supply valve (45) such that hot water is provided to the heat exchanger (41). The fan (42) will remain on and the supply valve (45) open until the thermostat senses that the temperature has risen above the set temperature. When the temperature has risen above the set temperature, the thermostat will turn off the fan (42) and close the supply valve (45).

As discussed above, hot water is supplied to the areas (22 and 24) of zone 1 by means of supply pipe (32) and is returned by means of return pipe (36). Also, hot water is supplied to the areas (25 and 27) of zone 2 by means of supply pipe (34) and is returned by means of return pipe (38). In the present invention, the hot water for a zone is alternately supplied by the two hot water sources. The system (10) first supplies zone 1 with hot water from the first heat source (12) while supplying zone 2 with hot water from the second heat source (14). Then after a period of time, the system switches and supplies zone 1 with hot water from the second heat source (14) while supplying zone 2 with hot water from the first heat source (12). Then after another period of time, the system switches back and supplies zone 1 with hot water from the first heat source (12) while supplying zone 2 with hot water from the second heat source (14). This alternating between heat sources and zones continues indefinitely.

In addition to switching the supply pipes (32 and 34), the system (10) also switches the returns pipes (36 and 38) to correspond with the supply lines (32 and 34). Thus, when a zone 1 is being supplied with hot water from the first heat source (12), the water returning from zone 1 is returned to the first heat source (12). When the system (10) switches and zone 1 is now receiving its hot water from the second heat source (14), the system switches the return pipe configuration such that the water being return from zone one is directed to the second heat source (14). In practice, except during the switching period, one heating source and one zone make up a closed heating system while the other heating source and the other zone comprise a different closed heating system.

The switching between heat sources and zones is actuated by a series of control valves (51, 52, 53 and 54). As shown in FIG. 1, the control valves (51, 52, 53 and 54) do not open and close but instead are two position valves used to direct the flow. Each of the control valves (51, 52, 53 and 54) includes a through or a 180 degree flow position and a redirect or 90 degree flow position. The terms through, 180 degree flow, redirect and 90 degree flow are used only to assist in the understanding of the accompanying drawings. The terms are in no way meant to limit the types of valves which could be utilized in the present invention. Many types of valve would perform the necessary function of these valves and are well known in the art. Nomenclature for these valves and the corresponding positions vary greatly in the industry. For example, one manufacturer calls these 2-way valves while another calls them 3-way. Still another calls this type of valve a Y-valve.

Hot water enters the system (10) from the second heat source (14) by means of pipe (61). The hot water from the second heat source (14) is propelled through the system (10) by means of a water pump (67). When valve (51) is in the through position the hot water pumped through pipe (61) is directed into supply pipe (34) which in turn supplies zone 2 with hot water. When valve (51) is in the redirect position the hot water pumped through pipe (61) is directed into supply pipe (32) which in turn supplies zone 1 with hot water.

Similarly, hot water enters the system (10) from the first heat source (12) by means of pipe (62). The hot water from the first heat source (12) is propelled through the system (10) by means of a water pump (68). When valve (52) is in the through position the hot water pumped through pipe (61) is directed into supply pipe (32) which in turn supplies zone 1 with hot water. When valve (52) is in the redirect position the hot water pumped through pipe (61) is directed into supply pipe (34) which in turn supplies zone 2 with hot water.

Water is returned to the second heat source (14) by means of pipe (63). When valve (53) is in the through position, pipe (63) is fed by water returning from zone 2 by means of return pipe (38). When valve (53) is in the redirect position, pipe (63) is fed by water returning from zone 1 by means of return pipe (36).

Similarly, water is returned to the first heat source (12) by means of pipe (64). When valve (54) is in the through position, pipe (64) is fed by water returning from zone 1 by means of return pipe (36). When valve (54) is in the redirect position, pipe (64) is fed by water returning from zone 2 by means of return pipe (38).

For the system to work properly, all of the controls valve (51, 52, 53 and 54) should be in the same position. Thus, either all of the control valves (51, 52, 53 and 54) should be in the through position or all of the control valves (51, 52, 53 and 54) should be in the redirect position. When the control valves (51, 52, 53 and 54) are in the through position, the first heat source forms a closed heating system with zone 1 while the second heat source forms a closed heating system with zone 2. When the control valves (51, 52, 53 and 54) are in the redirect position, the first heat source forms a closed heating system with zone 2 while the second heat source forms a closed heating system with zone 1.

As discussed above, the system (10) alternates the heat source and zone connections in part because the hot water provided by the first heating source (12) will be significantly hotter than the hot water provided by the second heating source (14). The alternating of the heat source and zone connection is accomplished by alternating the control valves (51, 52, 53 and 54) between the through position and the redirect position. All valves are controlled electronically and are switched simultaneously by means of a control circuit (80).

Figure 2:
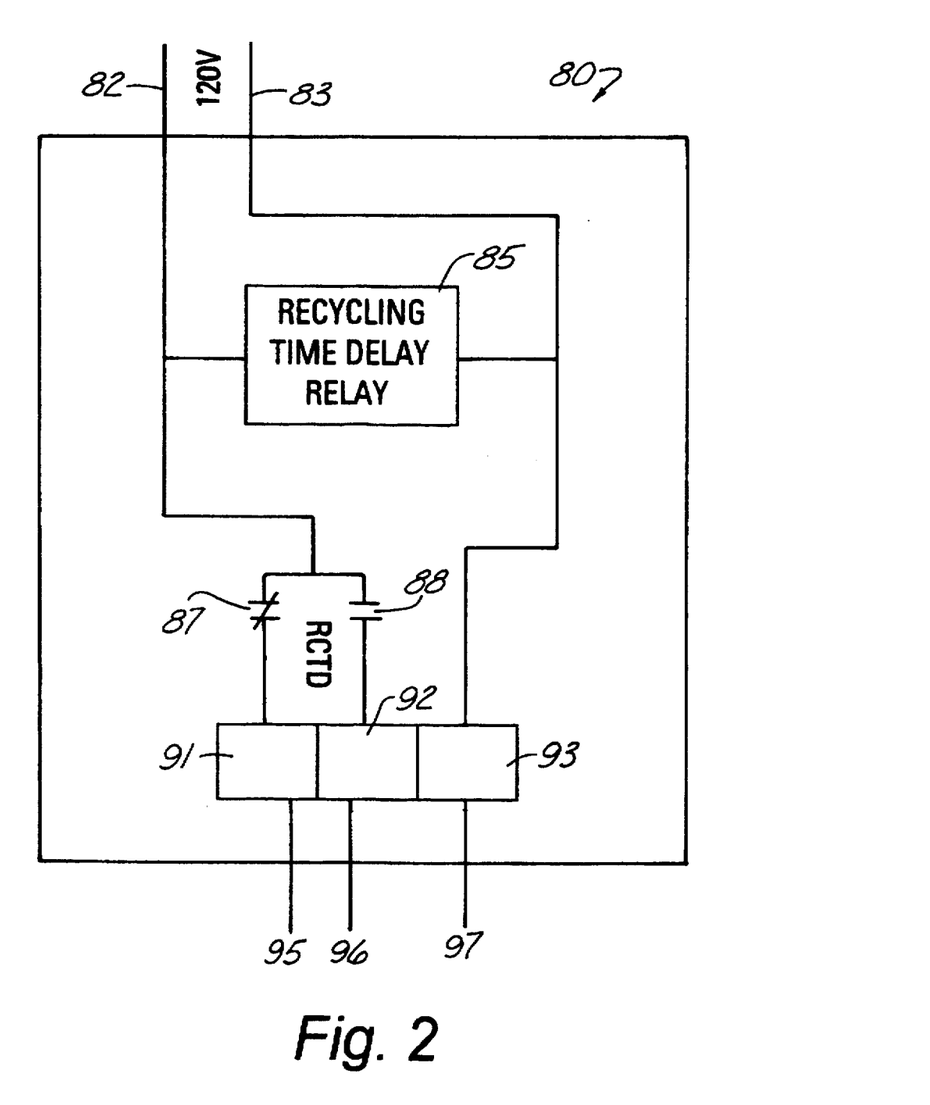
FIG. 2 is a schematic view of the recycling time delay relay circuit.

Referring to FIG. 2, the control circuit (80) used to control the control valves (51, 52, 53 and 54) is shown. The control circuit is powered by a 120 volt power source with the power supplied across lines (82 and 83). The control circuit includes a recycling time delay relay circuit (85). The recycling time delay relay circuit (85) controls relay switches (87 and 88) and does so in a time controlled manner. Relay switch (87) and relay switch (88) operate in a manner which is opposite with respect to each other. That is, if relay switch (87) is closed, then relay switch (88) is open. Likewise, if relay switch (87) is open, then relay switch (88) is closed. The recycling time delay relay circuit (85) switches the relay switches (87 and 88) from opened to closed and closed to open on a regular basis. Connection node (91) allows wire or wires (95) to be electrically connected to relay switch (87). Connection node (92) allows wire or wires (96) to be electrically connected to relay switch (88). Connection node (93) allows wire or wires (97) to be electrically connected to wire (83). Wires (95) are connected to the through position control of control valves (51, 52, 53 and 54). Wires (96) are connected to the redirect position control of control valves (51, 52, 53 and 54). Wires (97) are connected to the common wire of the control valves (51, 52, 53 and 54). As the recycling time delay relay circuit (85) switches the relay switches (87 and 88) between closed and opened positions, the control valves (51, 52, 53 and 54) alternated between the through position and the redirect position at regular intervals determined by the recycling time delay relay circuit (85).

In a preferred embodiment of the present invention, the recycling time delay relay circuit (85) switches the relay switches (87 and 88) and therefore switches the control valves (51, 52, 53 and 54) between the through position and the redirect position every five minutes or so. However, depending upon the individual characteristics of the system (10) a wide range of acceptable switching times may be appropriate. Additionally, it is not necessary that the time intervals be the same. For example, the cycle may have relay switch (87) open and relay switch (88) closed for five minutes, followed by relay switch (87) closed and relay switch (88) open for eight minutes. This may be necessary in situations where one zone requires a greater quantity of heat than the other zone.

Figure 3:
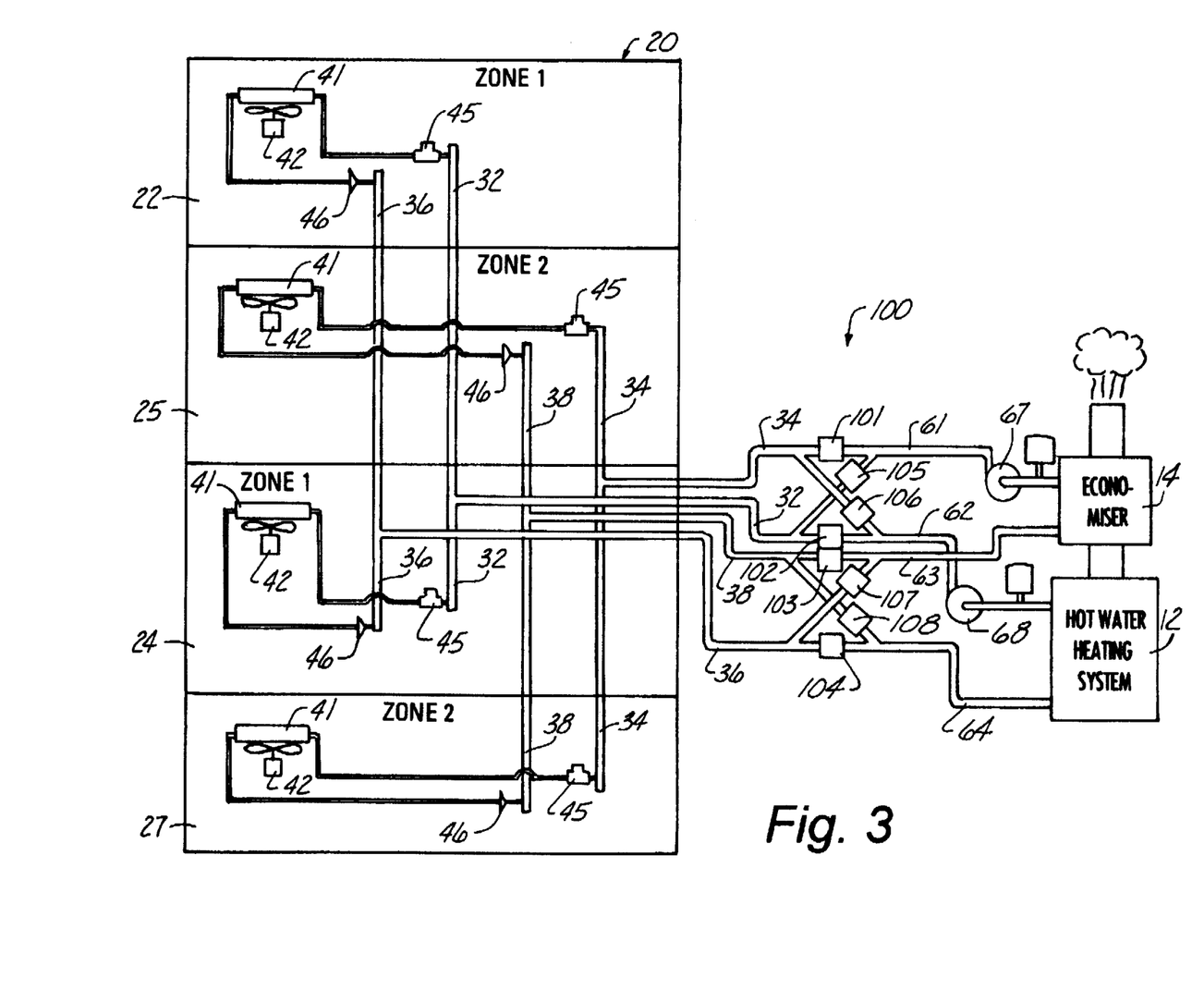
FIG. 3 is a schematic view of another embodiment of a dual heat source heating system built in accordance with the present invention.

Referring to FIG. 3, another embodiment of a dual heat source heating system (100) built in accordance with the present invention is shown. The heating system (100) as shown works essentially as the heating system (10) shown in FIG. 1. The difference being that the two position control valves (51, 52, 53 and 54) are replace with electronically controlled valves (101, 102, 103, 104, 105, 106, 107 and 108) which are either in an open position or a closed position. These valves are of similar type to the supply valves (45) discussed above with the exception that the system requirements may necessitate that these valves be larger.

Valves (101, 102, 103 and 104) are through valves while valves (105, 106, 107 and 108) are redirect valves. The system is designed such that all through valves (101, 102, 103 and 104) are open while all redirect valves (105, 106, 107 and 108) are closed and all through valves (101, 102, 103 and 104) are closed while all redirect valves (105, 106, 107 and 108) are open. When the through valves (101, 102, 103 and 104) are open and the redirect valves (105, 106, 107 and 108) are closed, the system (100) operates in a manner exactly as described above for system (10) when the control valves (51, 52, 53 and 54) are in the through position. When the through valves (101, 102, 103 and 104) are closed and the redirect valves (105, 106, 107 and 108) are open, the system (100) operates in a manner exactly as described above for system (10) when the control valves (51, 52, 53 and 54) are in the redirect position.

Figure 4:
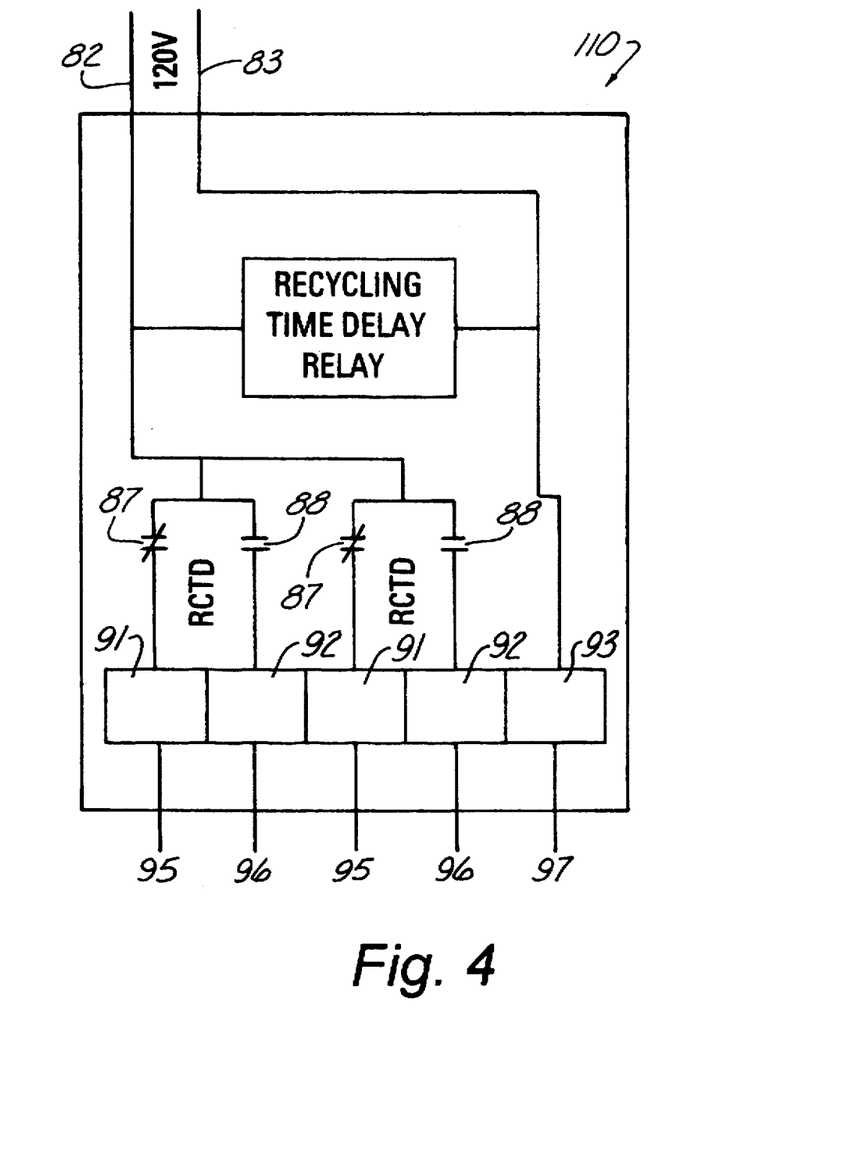
FIG. 4 is a schematic view of another recycling time delay relay circuit.

Referring to FIG. 4, a control circuit (110) used to control the through valves (101, 102, 103 and 104) and the redirect valves (105, 106, 107 and 108) is shown. The control circuit (110) is the same as the control circuit (80) of FIG. 2, with the difference being that the control circuit (110) includes a second set of relay switches (87 and 88) and connection nodes (95 and 96). This additional set of relay switches (87 and 88) and connection nodes (95 and 96) may be necessary or desirable for a variety of reasons. On the necessary side, the relay switches (87 and 88) may not be powerful enough to drive all of the valves. On the desirable side, it may be less confusing to wire the through valves in one place and the redirect valves in another.

In the embodiment of FIG. 3, the through valves (101, 102, 103 and 104) open control wires should be connected to wires (95). The redirect valves (105, 106, 107 and 108) open control wires should be connected to wires (96). If the valves are also electronically closed, the through valves (101, 102, 103 and 104) close control wires should be connected to wires (96) and the redirect valves (105, 106, 107 and 108) close control wires should be connected to wires (95). The common wires from all the valves (101, 102, 103, 104, 105, 106, 107 and 108) should be connected to wires (97).

Figure 5:
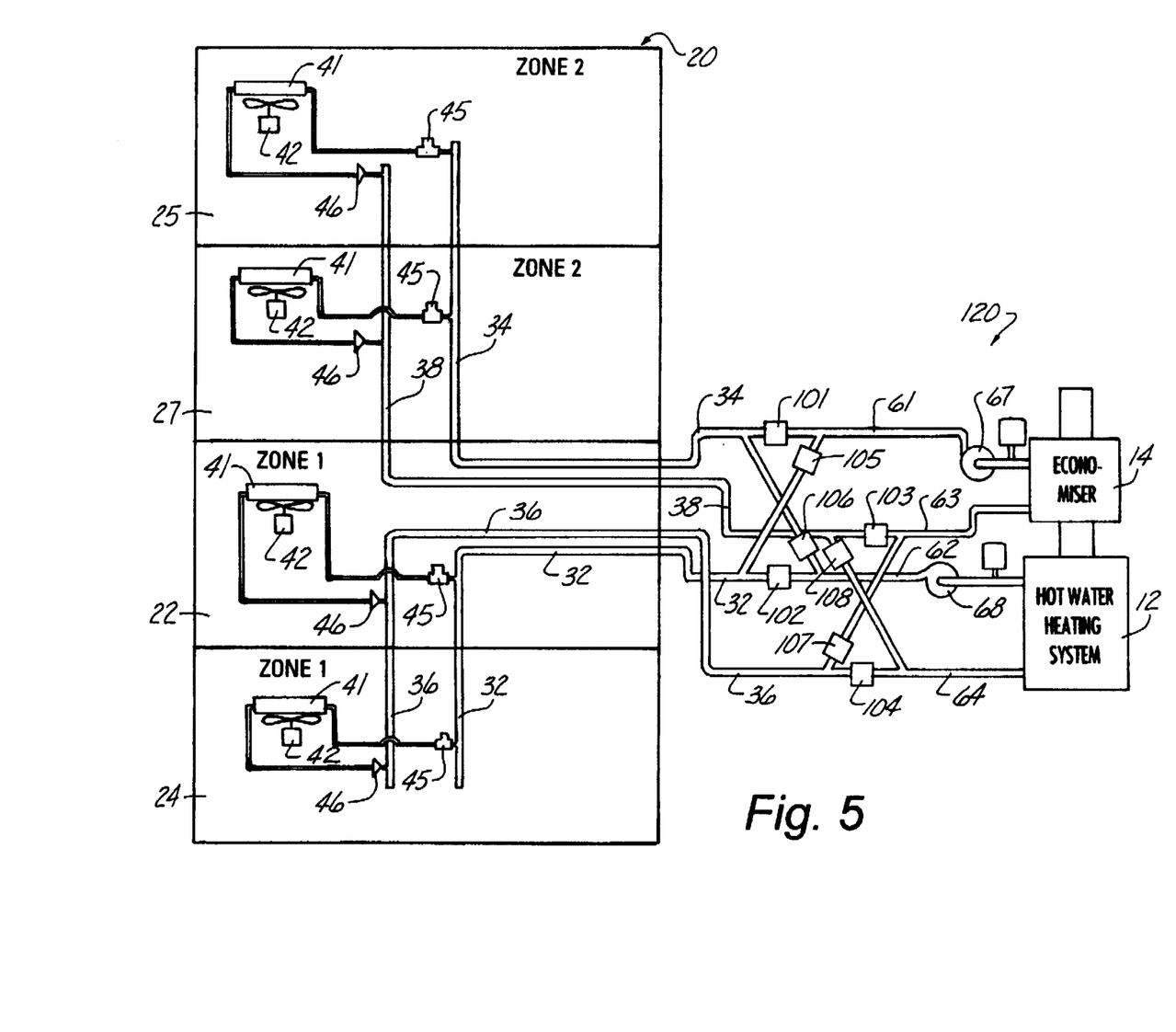
FIG. 5 is a schematic view of still another embodiment of a dual heat source heating system built in accordance with the present invention.

Referring now to FIG. 5, another embodiment of a dual heat source heating system (120) built in accordance with the present invention is shown. This embodiment of the heating system of the present invention is virtually identical to the embodiment of the heating system (100) of FIG. 3. In this embodiment, the individual areas of the zones have not been positioned in an alternating fashion. This embodiment shows that multiple areas of a zone can be contiguous with one another. This implementation of the present invention may be beneficial. Two examples of when this configuration might be more appropriate is when significant plumbing expenses can be saved during construction and when an existing building is being retroactively fitted with a heating system built in accordance with the present invention.

Figure 6:
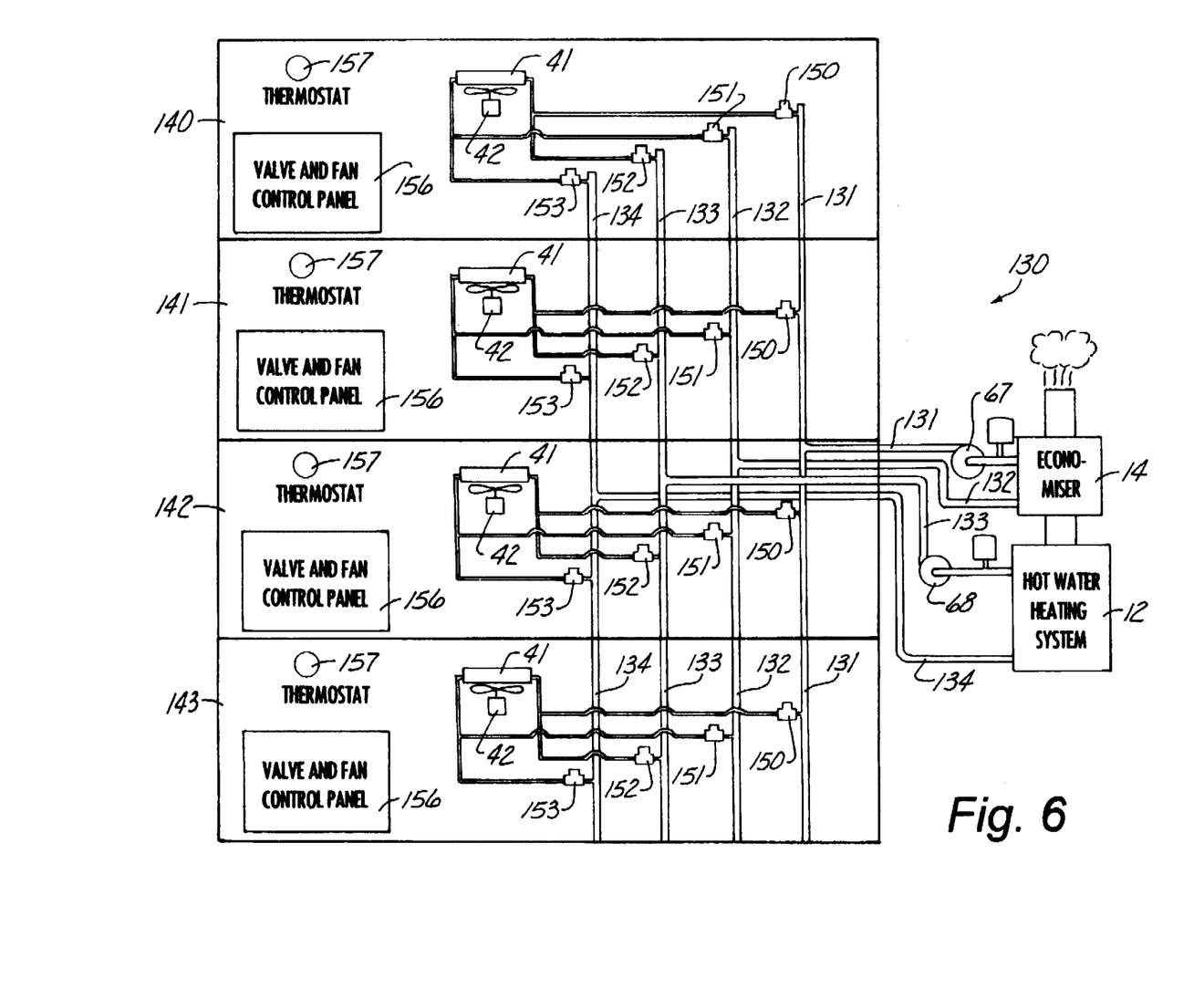
FIG. 6 is a schematic view of yet another embodiment of a dual heat source heating system built in accordance with the present invention.

Referring to FIG. 6, still another embodiment of a dual heat source heating system (130) built in accordance with the present invention is shown. The heating system (130) includes a first heat source (12) and a second heat source (14). Hot water from the second heat source (14) is supplied to all areas (140, 141, 142 and 143) by means of supply pipe (131) and is propelled through the system by means of a pump (67). Water is returned to the second heat source (14) by means of return pipe (132). Hot water from the first heat source (12) is supplied to all areas (140, 141, 142 and 143) by means of supply pipe (133) and is propelled through the system by means of a pump (68). Water is returned to the first heat source (12) by means of return pipe (134).

Each area (140, 141, 142 and 143) includes a heat exchanger (41) and a fan (42) which function and operate in a similar manner as discussed previously. Each area also includes a second heat source supply valve (150), a second heat source return valve (151), a first heat source supply valve (152), and a first heat source return valve (153). Each area also includes a valve and fan control circuit (156) and a thermostat (157).

In this embodiment, each area serviced by the heating system (130) is assigned to be in either a first zone or a second zone. However, instead of the zone being determined by the pipes, the zone is determined by the wiring of the valve and fan control circuit (156). This feature will be discussed in greater detail below. When a particular area needs heats, the need being determined by the thermostat (157) in a manner similar to the manner discussed above, hot water is sent to the heat exchanger (41) and the fan (42) distributes the heat to that particular area. The heat source utilized by the area to supply the hot water cycles back and forth as before.

If a particular area needs heat and is at a point in the cycle where the hot water is to come from the first heat source (12), then the valve and fan control circuit (156) for that particular will open supply valve (152) and return valve (153) for that area so that water from the first heat source (12) via supply pipe (133) will be pumped through the heat exchanger (41). The water will return to the first heat source (12) via return pipe (134). Supply valve (150) and return valve (151) for that area remain closed. When the area has received enough heat, the valve and fan control circuit (156) will turn off the fan (42) and close supply valve (152) and return valve (153).

If a particular area needs heat and is at a point in the cycle where the hot water is to come from the second heat source (14), then the valve and fan control circuit (156) for that particular will open supply valve (150) and return valve (151) for that area so that water from the second heat source (14) via supply pipe (131) will be pumped through the heat exchanger (41). The water will return to the second heat source (14) via return pipe (132). Supply valve (152) and return valve (153) for that area remain closed. When the area has received enough heat, the valve and fan control circuit. (156) will turn off the fan (42) and close supply valve (150) and return valve (151).

If at the end of a cycle, that is if it is time for an area to start utilizing a different heat source, the area is still needing heat and water is still pumping through the heat exchanger (41), then the valve and fan control circuit (156) will automatically close the two valves for the heat source from which the area was receiving hot water and simultaneously open the two valves for the other heat source. By way of example, if area (14) is in need of heat and is to receive that heat from the first heat source (12), then the valve and fan control circuit (156) would open supply valve (152) and return valve (153). If the cycle ends while area (141) still needs heat, the valve and fan control circuit (156) will automatically close valves (152 and 153) while simultaneously opening supply valve (150) and return valve (151). This way, area (141) continues to receive heat as needed but switches to receive the heat from the appropriate heat source as determined by the cycle which requires switching back and forth between heat sources at given time intervals.

Figure 7:
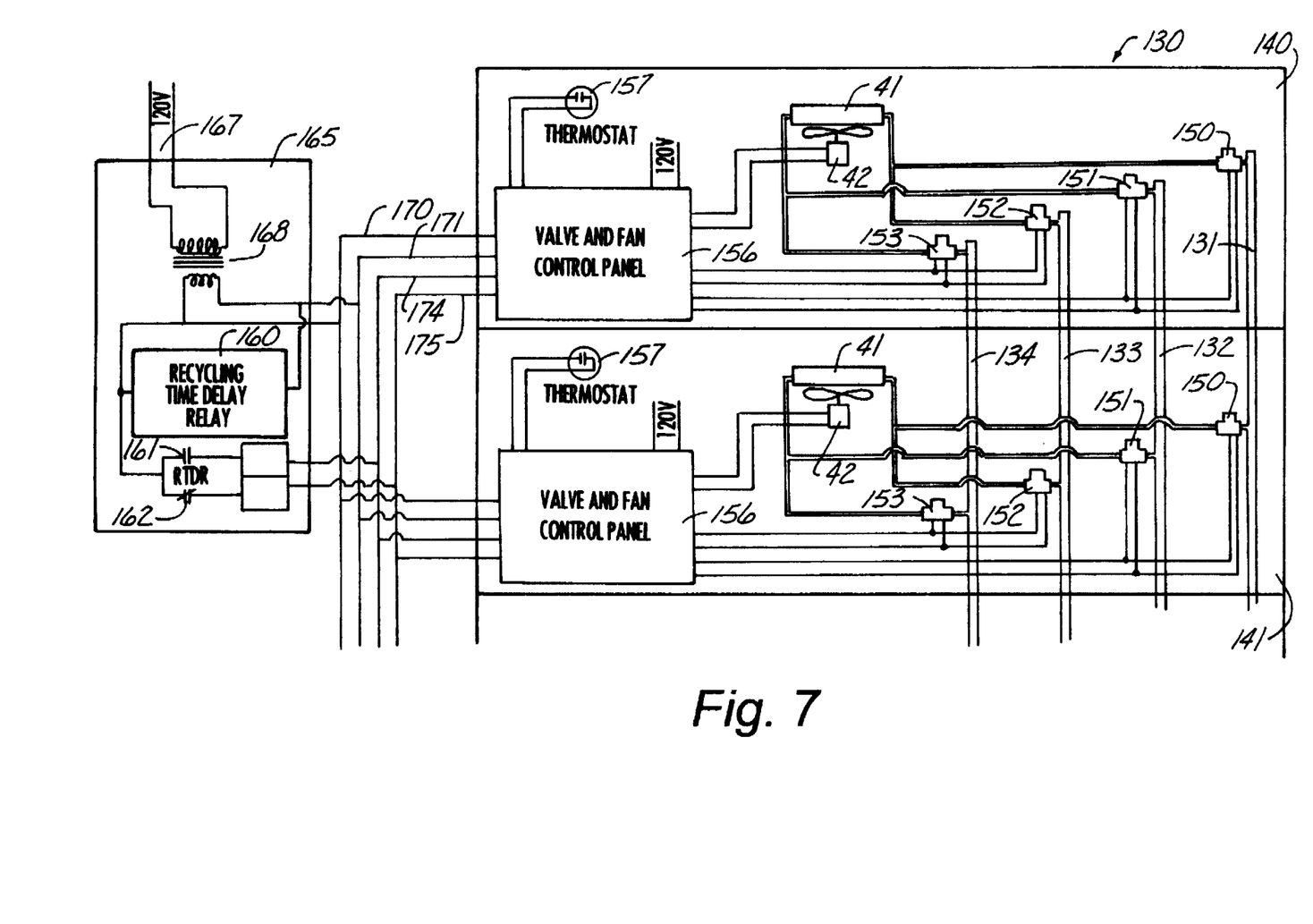
FIG. 7 is a schematic view of the dual heat source heating system of FIG. 6 including the recycling time delay relay circuit.

Referring to FIG. 7, part of the heating system (130) is shown with the recycling time delay circuit (160). The recycling time delay circuit (160) is part of an overall circuit (165) which operates in a manner similar to the circuit (80) described in FIG. 2. The circuit (165) is powered by a 120 volt source (167). A transformer (168) is included to shown what might be necessary should part or all of the electronic components of the present invention require something varying from 120 volts. For example, many valve and thermostats are designed to operate on 24 volts. The recycling time delay circuit (160) controls relay switches (161 and 162). The relay switches (161 and 162) work opposite of each other as before. If relay switch (161) is open then relay switch (162) is closed. If relay switch (161) is closed then relay switch (162) is open. Relay switches (161 and 162) open and close at time intervals determine by the recycling time delay circuit (160).

Still referring to FIG. 7, wires are shown connecting the valve and fan control circuit (156) and the valves (150, 151, 152 and 153), the fan (42) and the thermostat. Only two wires are shown connected to the valves (150, 151, 152 and 153). One wire is used for open control and the other wire is used for close control. The third wire which is the common wire for each of the valves (150, 151, 152 and 153) is not shown. If the valves did not electronically close but instead closed automatically, there would only be a need for two wires.

Wire (170) is the always hot wire and wire (171) is the common wire. Wires (174 and 175) are the wires which are connected to relay switches (161 and 162). One of the wires (174 and 175) is hot while the other wire is open. Which wire is hot at a given time is determined by the state of the relay switches (161 and 162) which in turn are controlled by the recycling time delay circuit (160).

Figure 8:
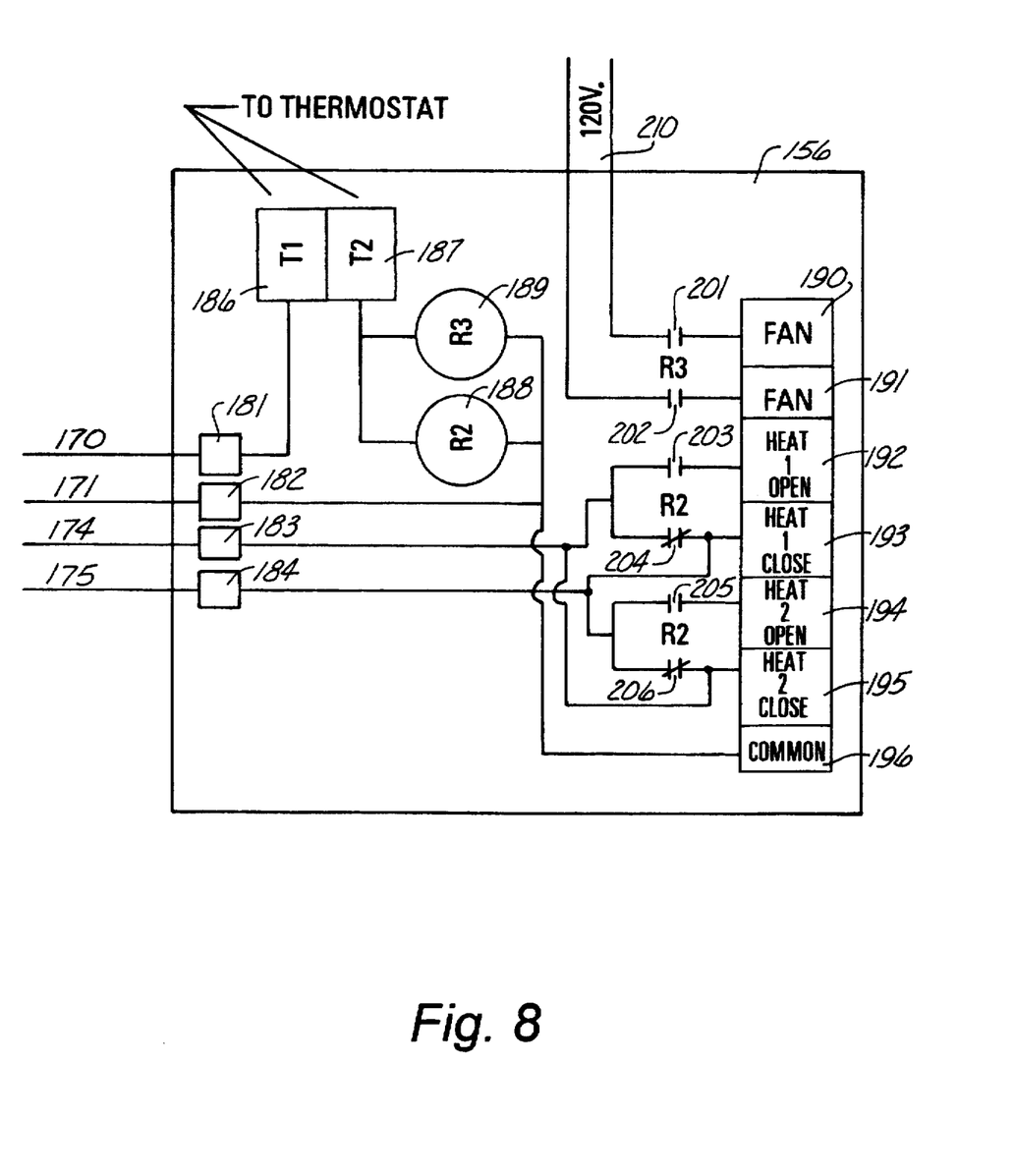
FIG. 8 is a schematic view of the valve and fan control circuit for the dual heat source heating system of FIG. 6.

Referring now to FIG. 8, the valve and fan control circuit (156) is shown. Wire (170) is connected to connector (181) which in turn is wired to the first thermostat connector (186). The second thermostat connector (187) is connected to relay R2 (188) and relay R3 (189). Relay R2 (188) and relay R3 (189) are in turn connected to the common connector (182) which is in turn connected to the common wire (171). The thermostat (157) is connected to and across connector (186) and connector (187).

Wire (174) is connected to connector (183). Wire (175) is connected to connector (184). When the wires are connected in this fashion, the area controlled by this valve and fan control circuit (156) operates in zone 1. If the area is to operate in zone 2, then wire (174) should be connected to connector (184) and wire (175) is connected to connector (183). The way these two wires are connected determines in which zone the area is. This feature makes this embodiment of the present invention very versatile since the zone of a particular area can be changed by switching two wires. This allows for area reallocation into different zones if the original allocation proves to be undesirable.

In another embodiment (not shown) a switch could be utilized to determine whether the area was in zone 1 or zone 2. In this embodiment, the wire (174) would be connected to connector (183) and the wire (175) would be connected to connector (184). The switch would be placed on the other side the non-connection side of the connectors (183 and 184). The switch would include two positions. When set in the first position, the zone 1 position, the switch would continue to connect the wires as shown. When set in the second position, the zone 2 position, the switch would reverse the wires. Thus, changing the position of the switch changes the zone selection for the area without the need for reconnecting wires.

The wires coming in from the fan (42) are connected to the connectors (190 and 191). The open control wires for supply valve (152) and return valve (153) are connected to connector (192). The close control wires for supply valve (152) and return valve (153) are connected to connector (193). The open control wires for supply valve (150) and return valve (151) are connected to connector (194). The close control wires for supply valve (150) and return valve (151) are connected to connector (195). The common wires for all of the valves are connected to connector (196).

If the thermostat is not tripped or closed, then neither relay R2 (188) nor relay R3 (189) is tripped. If relay R2 (188) and relay R3 (189) are not tripped, then relay switch (201) is open, relay switch (202) is open, relay switch (203) is open, relay switch (204) is closed, relay switch (205) is open and relay switch (206) is closed. When the thermostat is tripped then relay R2 (188) and relay R3 (189) are also tripped. If relay R2 (188) and relay R3 (189) are tripped, then relay switch (201) is closed, relay switch (202) is closed, relay switch (203) is closed, relay switch (204) is open, relay switch (205) is closed and relay switch (206) is open.

During operation, only one of line (174) and line (175) will be hot. The other will be open. The circuit is designed such that if the thermostat (157) is not calling for heat, that is not tripped or not closed, then all of the valves will be closed and remain closed. If the thermostat (157) is calling for heat, then the relay switches (201 and 202) are closed and the fan (42) turns on. In the embodiment shown, the fan derives its power from a 120 volt power supply (210).

If the thermostat (157) is calling for heat, then either the first heat source valves (152 and 153) must be opened or the second heat source valves (150 and 151) must be opened. Which valves are opened will depend upon which of line (174) and line (175) is hot. If line (174) is hot, then the first heat source valves will open. If line (175) is hot, then the second heat source valves will open. These valves will remain open until the thermostat (157) quits calling for heat. At this time the switch relays (201–206) will flip flop and the open valves will close. This reversal will not cause the closed valves to open.

If while the thermostat (157) is calling for heat and one set of valves are open, the recycling time delay circuit (160) causes wires (174 and 175) to reverse, that is the hot wire becomes open end the open wire becomes hot, the circuit (156) closes the valves currently open and simultaneously opens the valves which were closed. The fan (42) remains on.

Figure 9:
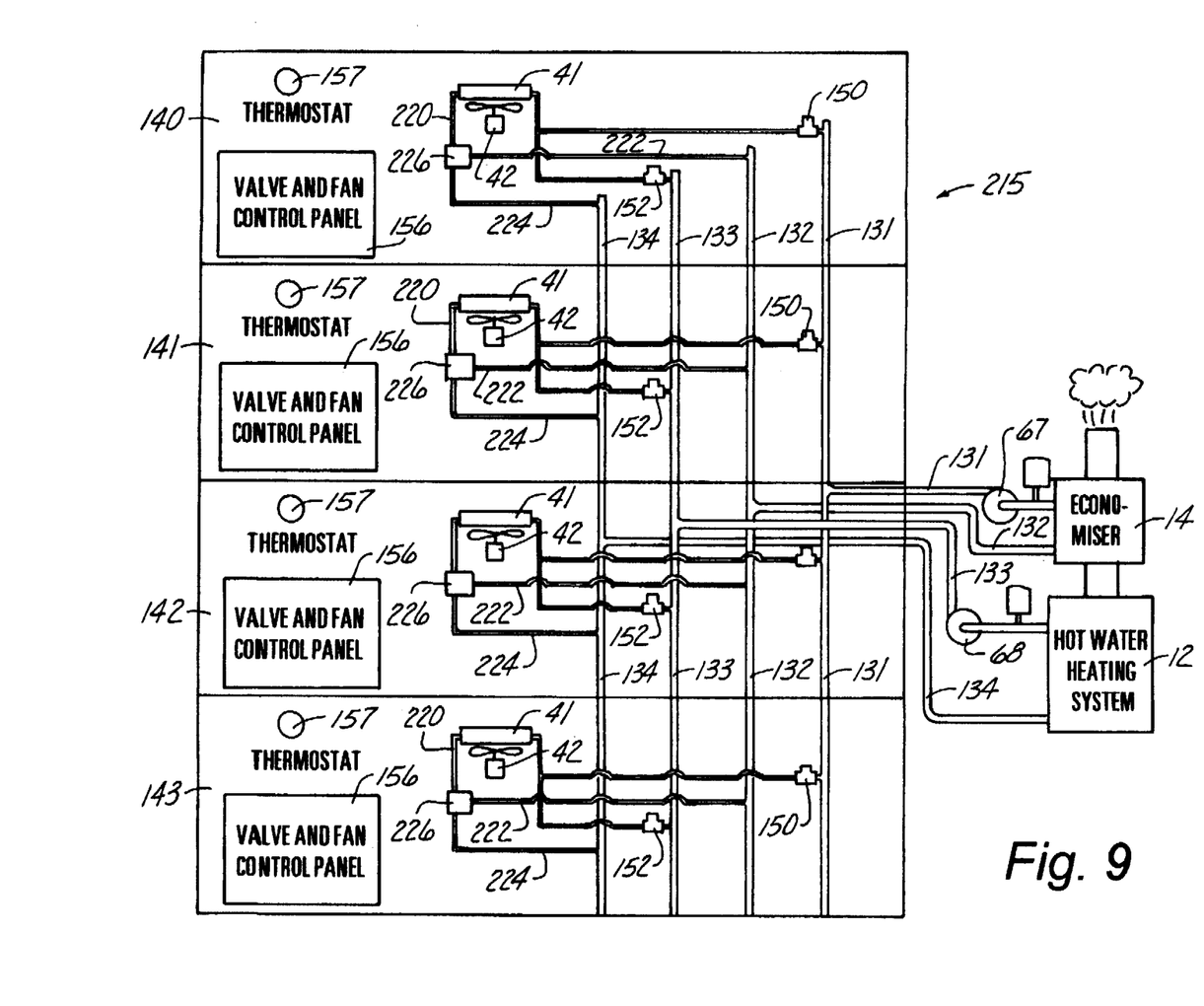
FIG. 9 is a schematic view of still another embodiment of a dual heat source heating system built in accordance with the present invention.

Referring now to FIG. 9, still another embodiment of a dual heat source heating system (215) is shown. The system (215) is the same as the system (130) as shown in FIG. 6 with the exception that the return valve (153) and the return valve (151) have been removed and replaced with a two position valve (226). The two position valve (226) operates in a manner identical to the two position valves discussed above. The valve (226) includes a through position and a redirect position.

In this embodiment, water exits the heat exchanger (41) via pipe (220). Pipe (220) is connected to the valve (226). When the valve (226) is in the through position, water exiting the heat exchanger (41) via pipe (220) is directed to pipe (224) which ultimately connects to the return pipe (134) for the first heat source (12). When the valve (226) is in the redirect position, water exiting the heat exchanger (41) via pipe (220) is redirected to pipe (222) which ultimately connects to the return pipe (132) for the second heat source (14).

If supply valve (150) is open, the valve (226) is set in the redirect position such that the water exiting from the heat exchanger (41) is ultimately returned to the second heat source (14). Similarly, if supply valve (152) is open, the valve (226) is set in the through position such that the water exiting from the heat exchanger (41) is ultimately returned to the first heat source (12). If neither supply valve (150) nor supply valve (152) is open, then the position of valve (226) does not matter.

The valve and fan control circuit (156) for the present embodiment would be the same as the valve and fan control circuit (156) shown in FIG. 8. The supply valves (150 and 152) are connected as discussed previously. The control wire used to set the valve (226) in the through position is connected to connector (192) which will set the valve (226) to return the water to the first heat source (12). The control wire used to set the valve (226) in the redirect position is connected to connector (194) which will set the valve (226) to return the water to the second heat source (14).

Obviously, many modifications and variations of the present invention are possible in light of the above teachings. It is therefore to be understood that, within the scope of the appended claims, the invention may be practiced otherwise than as specifically described.

I claim:

1. A heating system for heating a building, said building including a first zone and a second zone to be heated, comprising:

a first heat source;

a second heat source;

first transferring means for transferring heat, wherein said first transferring means including means for transferring heat from said first heat source to said first building zone and wherein said first transferring means including means for transferring heat from said second heat source to said second building zone;

second transferring means for transferring heat, wherein said second transferring means including means for transferring heat from said first heat source to said second building zone and wherein said second transferring means including means for transferring heat from said second heat source to said first building zone;

means for utilizing said first transferring means and said second transferring means in an alternating manner;

wherein said first transferring means and said second transferring means utilizes hot water for the transferring of heat;

wherein said first heat source comprises a hot water boiler system; and wherein said second heat source comprises a heating system which utilizes the recovered from said first heat source which is not transferred.

2. The heating system of claim 1 wherein said second heat source includes heat recovery means for recovering heat from the exhaust stack of said first heat source.

3. A method of heating a building, said building divided into a first zone and a second zone, comprising the steps of:

providing heat from a first heat source;

providing heat from a second heat source;

transferring heat from said first heat source to said first building zone and transferring heat from said second heat source to said second building zone;

transferring heat from said first heat source to said second building zone and transferring heat from said second heat source to said first building zone; and alternating between transferring heat from said first heat source to said first building zone and transferring heat from said second heat source to said second building zone, and transferring heat from said first heat source to said second building zone and transferring heat from said second heat source to said first building zone;

utilizing a hot water heating system as the source for the first heat source; and utilizing a heat recovery device which can recover the heat escaping in the exhaust of the first heat source as the source for the second heat source.

4. The heating system of claim 1:

wherein said first zone of said building includes at least one area;

wherein said first transferring means for transferring heat and said second transferring means for transferring heat includes means for transferring heat to each area of said first zone;

wherein said second zone of said building include at least one area; and wherein said first transferring means for transferring heat and said second transferring means for transferring heat includes means for transferring heat to each area of said second zone.

5. The heating system of claim 4 wherein each area of said first zone and said second zone include means for exchanging heat wherein the heat transferred to each area is communicated into said area.

6. The heating system of claim 5 wherein each area of said first zone and said second zone includes means for selectively activating and deactivating said means for exchanging heat.

7. The heating system of claim 6 wherein said means for selectively activating and deactivating said means for exchanging heat includes a thermostat.

8. The heating system of claim 1 wherein said means for utilizing said first transferring means and said second transferring means in an alternating manner includes valve means functionally positioned in close proximity to said first heat source and said second heat source.

9. The heating system of claim 1 wherein said means for utilizing said first transferring means and said second transferring means in an alternating manner includes valve means functionally positioned in said first zone and said second zone.

10. The heating system of claim 4 wherein said means for utilizing said first transferring means and said second transferring means in an alternating manner includes valve means functionally positioned in each area of said first zone and said second zone.

11. The method of claim 3 including utilizing a heat recovery device which can recover heat from the exhaust stack of the first heat source.

12. The method of claim 3 including the steps of:

dividing each of said first zone and said second zone into one or more areas; and transferring heat to each area in said first zone and said second zone.

13. The method of claim 12 including the step of utilizing a heat exchanger in each area of said first zone and said second zone for communicating the transferred heat into heat area.

* * * * *